J. SCMITT.
Middlings-Purifiers.

No. 152,012. Patented June 16, 1874.

Witnesses:
Chas. F. Meisner.
J. W. Herthel.

Inventor:
Jacob Schmitt
per. Herthel & Co
Attys.

UNITED STATES PATENT OFFICE.

JACOB SCHMITT, OF ST. LOUIS, MISSOURI.

IMPROVEMENT IN MIDDLINGS-PURIFIERS.

Specification forming part of Letters Patent No. 152,012, dated June 16, 1874; application filed April 21, 1874.

*To all whom it may concern:*

Be it known that I, JACOB SCHMITT, of St. Louis, Missouri, have invented an Improved Middlings-Separator, of which the following is a specification:

This invention relates chiefly to the combination of parts by which an improved separation of middlings is achieved, in manner now more fully to be described.

Figure 1:
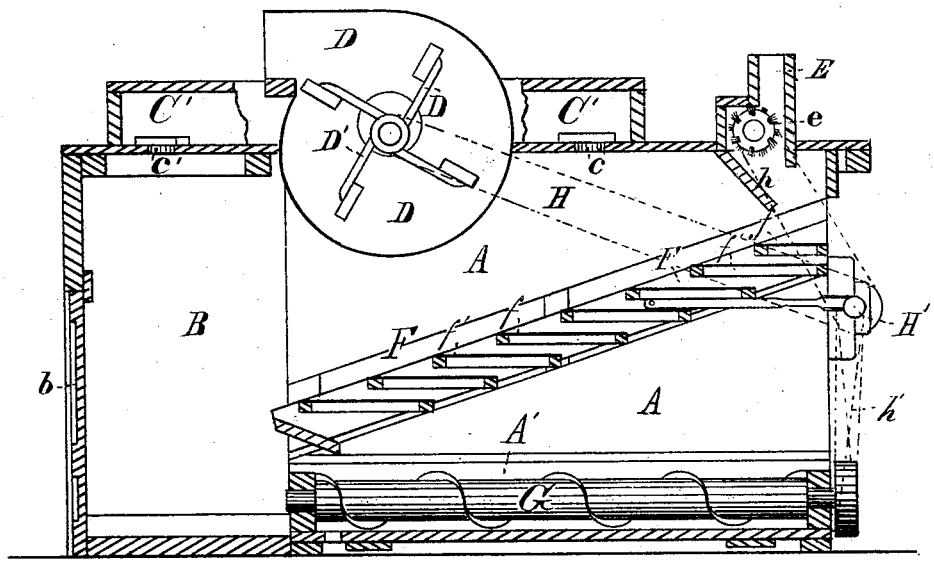
Figure 2:
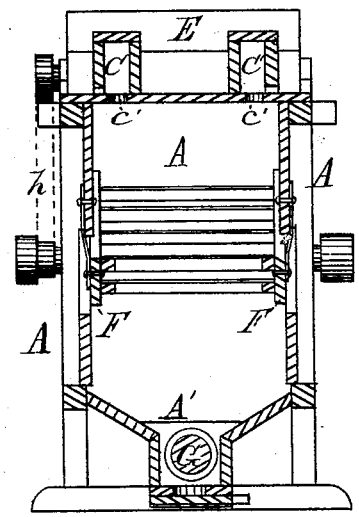
Figure 3:
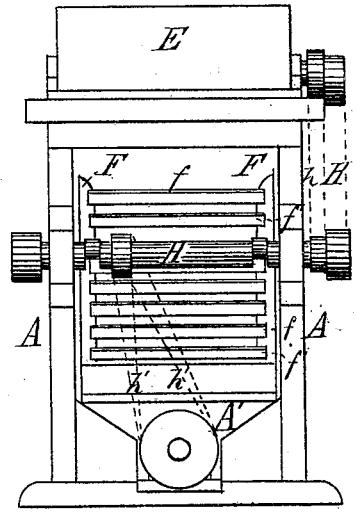

Of the drawing, Figure 1 is a longitudinal sectional elevation. Fig. 2 is a transverse sectional elevation; Fig. 3, a front view or elevation.

A is the inclosing-frame, its bottom having slanting sides, connecting to a conveyer-box, A'. Forming part of frame A, at one end, is a settling-chamber, B; this has a hinged entrance-door, C. Top of frame A and chamber B I provide draft horizontal spouts C C'. These have open passages, so as to communicate with both sides of a fan-case, D, which is between said spouts. At c c', Fig. 1, each spout C C' has an aperture or opening, communicating with interior of frame A or machine. Within fan-case is a revolving fan, D'. As the air enters the machine it is caused by the suction produced by the fan D' to be drawn in currents up and through the first apertures c into the spouts C C', and thence into fan-case. Similarly, the air-currents passing the first apertures c are forced to enter the apertures c' into the spouts, and thence to fan-case. I thus achieve a suctional force of air throughout the interior of the machine, which separates from the passing middlings its lighter stuff, impurities, &c., and forces and carries same with it in its passage into the spouts and fan-case above; thence said impurities are blown out. The middlings are fed into the hopper E, which contains a revolving brush, e, and which, catching the middlings, distributes them evenly to the top series of the shaking sieves F. The sieves F consist of a frame having two sets of sieves arranged alternately, as shown at $f f'$, Fig. 1, and so that every lower sieve, $f'$, will be of finer cloth, while the upper, $f'$, will be coarser. The sieves F by their frame are suspended from the frame A, so that by any proper connection to power-shaft, a reciprocating motion is imparted to said sieves. The shaking action of the sieves subject the middlings to a separating action in their passage from and through the upper sieve series, down along and through the entire series, until said middlings are passed over the lower or bottom of the sieves. As each sieve is a separator in itself, the combined separating action, taking place as the middlings pass over the whole series of sieves, produces a finer and better quality. The purified middlings pass through the sieves into the conveyer below. Hence, G is the conveyer, as usual. The conveyer-box A' at bottom has one or more slide-openings, from which the final discharge of the purified middlings or grades of middlings can be had. The fan-shaft is operated by the belting H connecting to pulley of power-shaft H', the brush-shaft by belting $h$ connecting to small pulley on power-shaft H'. The conveyer-shaft has its pulley connected by belting $h'$ to pulley on power-shaft.

The operation of the machine is, therefore, as follows: The middlings, being fed into the hopper E, are distributed by the revolving brush $e$ evenly on the top series of the shaking sieves F. Here the middlings pass over and through the coarse and fine sieves $f f'$, and in its further passage over the entire sieves it will be noted that the suctional currents of air going on in the interior of the machine, as before described, act upon all particles of middlings, and subject same to a most complete separation; and, further, in doing so, said suctional force of air, passing in the direction of the fan-case, also carries with it all the light dust, impure matter, and separation effected from the middlings, leaving the purer middlings to gravitate below into the conveyer. The impurities from middlings, not passing up and out with the air-currents through the apertures c, are still subject to be caught and forced out with the currents passing through the apertures c'. The remaining heavier and coarser impure particles of the middlings fall from the lower sieve into the settling-chamber B. The apertures c c' in the draft-spouts C C' have slides by which the suctional force in the machine can be regulated. The sides of the frame A can have sliding doors, through which the sieves can be cleansed when desired.

What I claim is—

1. The combination of the spouts C C', having apertures $c\ c'$, fan $D'$, sieves F, and frame A, with its settling-chamber B, when constructed and arranged to operate in the manner shown and described.

2. The combination of the fan $D'$, draft-spouts C $C'$, having apertures $c\ c'$, frame A, settling-chamber B, conveyer G, reciprocating sieves F, feed-hopper E, and revolving brush $e$, all arranged to operate as herein shown and specified.

In testimony of said invention I have hereunto set my hand.

JACOB SCHMITT.

Witnesses:
WILLIAM W. HERTHEL,
CHAS. F. MEISNER.